United States Patent
Moratschek

[15] 3,697,054
[45] Oct. 10, 1972

[54] MACHINE FOR MAKING BATCHES OF MORTAR

[72] Inventor: Frank G. Moratschek, c/o The David Hummel Building Co., 1326 Tennessee Avenue, Cincinnati, Ohio 45229

[22] Filed: Dec. 10, 1970

[21] Appl. No.: 96,831

[52] U.S. Cl. ............... 259/154, 259/165, 259/168
[51] Int. Cl. ............................................. B28c 7/04
[58] Field of Search ...... 259/154, 164, 165, 149, 161, 259/162, 163, 168

[56] References Cited

UNITED STATES PATENTS

2,109,534   3/1938   Johnson .................. 259/154
2,946,574   7/1960   Munderich ............... 259/154

*Primary Examiner*—Robert W. Jenkins
*Attorney*—Pearce & Schaeperklaus

[57] ABSTRACT

A mortar mixing machine including a mixing hopper, weigh frames pivotally mounted above the mixing hopper, weigh hoppers mounted on the weigh frames, conveyors for advancing granular solid material to the weigh hoppers, and means for supplying a predetermined amount of water to the mixing hopper. Switches are actuated by the weigh hoppers to arrest the conveyors when there is a predetermined weight of the sold material in the weigh hopper. The contents of the weigh hoppers is dumped into the mixing hopper after the water has been supplied thereto to be mixed to form a batch of mortar.

2 Claims, 16 Drawing Figures

FIG. 16

INVENTOR.
FRANK G. MORATCHEK 3,697,054

MACHINE FOR MAKING BATCHES OF MORTAR

This invention relates to a machine for making batches of mortar and the like.

An object of this invention is to provide a machine which automatically measures amounts of solid and liquid constituents of mortar or the like and dumps these constituents into a mixing device which mixes the constituents to form a batch of mortar.

Briefly, this invention provides a mortar making machine which includes weigh hoppers for sand and cement which are supported on balance frames. Sand and cement are loaded into the weigh hoppers until the hoppers have appropriate loads. Then, the balance frames swing sufficiently to operate switches which control and stop action of conveyors which feed the sand and cement into the hoppers. An appropriate amount of water is loaded into a mixing hopper, and the weigh hoppers are dumped into the mixing hopper and the contents of the mixing hopper are mixed together to form a batch of mortar or the like.

The above and other objects and features of the invention will be apparent from the following detailed description and the drawings, in which.

In the following detailed description and the drawings, like reference characters indicate like parts.

Figure 1:
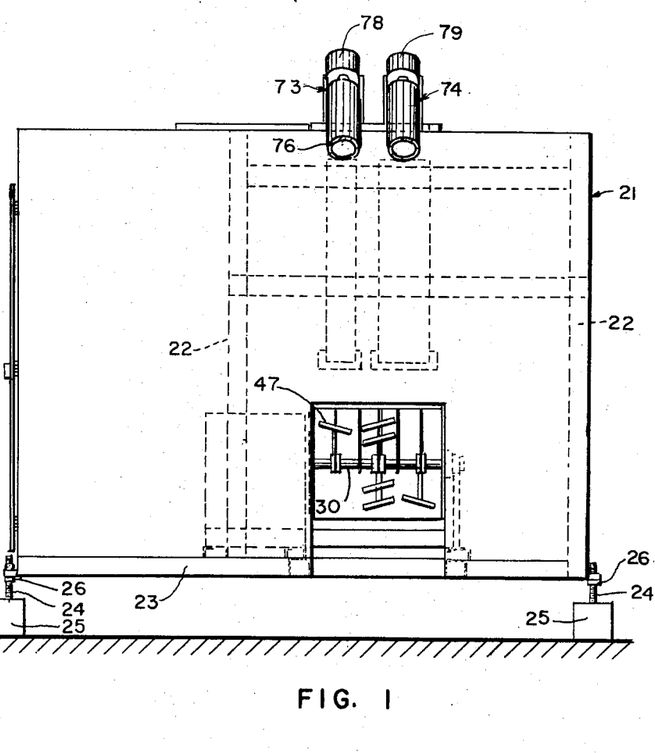
FIG. 1 is a view in front elevation of an enclosure which surrounds a mortar mixing machine constructed in accordance with an embodiment of this invention, a portion of the machine being exposed through an opening in the enclosure, portions of conveyors being shown in association therewith.
Figure 2:
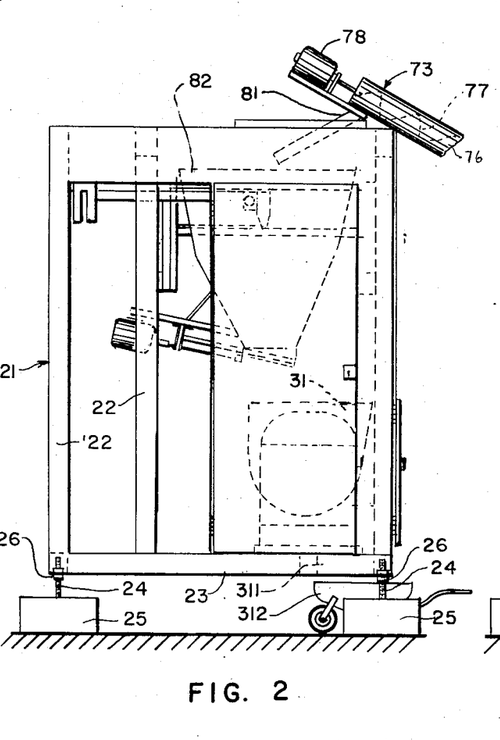
FIG. 2 is a view in side elevation of the enclosure shown in FIG. 1.

In FIGS. 1 and 2 is shown an enclosure 21 including upright frame elements 22 and horizontal frame elements 23 which are rigidly attached together to form a framework that is supported on adjustment screws 24. The screws 24 are supported on appropriate blocks 25. Nuts 26 on the adjustment screws can be turned to level the frame elements 23 and a floor 27 (FIGS. 3 and 4) of the enclosure, which is supported on the horizontal frame elements 23. On the floor 27 are mounted bearing supports 28 and 29 for a shaft 30 and for an open-topped mortar mixing hopper 31. The hopper 31 can swing between the full line position of FIG. 4, which is a dumping position, and the dot-dash line position 31a of FIG. 4, which is a loading position. A reversible motor 32 drives gearing (not shown) in a gear box 33 to drive a shaft 34 and a sprocket 35 mounted on the shaft 34. A chain 36 runs on the sprocket 35 and on a large sprocket 37 mounted on the hopper 31. Action of the motor 32 swings the hopper between the loading and dumping positions. Lugs 38 and 39 (FIG. 3) are mounted on the bottom of the hopper 31. When the hopper 31 is in the loading position, the lug 38 engages a switch operator 41 of a loading position limit switch 42. When the hopper 31 is in the dumping position, the lug 39 engages a switch operator 43 of a dumping position limit switch 44.

Figure 6:
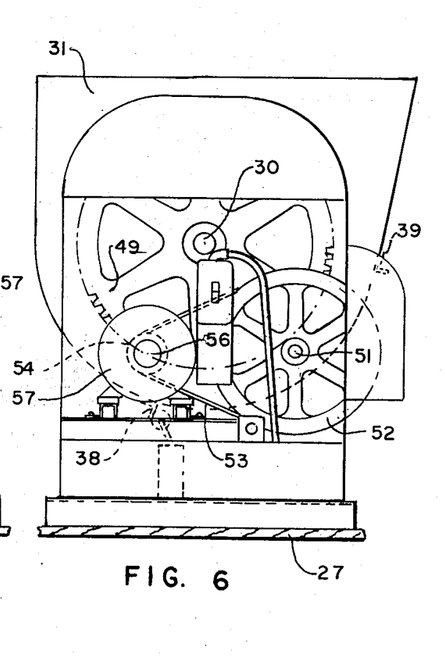
FIG. 6 is a view in side elevation of the mixer portion of the machine shown in FIG. 5.

An appropriate set of mixing vanes 47 (FIG. 1) is mounted on the shaft 30. The mixing vanes 47 swing inside the mixing hopper 31 to mix constituents therein. The shaft 30 carries a gear 49 (FIG. 6) which engages a pinion (not shown) carried by a shaft 51. The shaft 51 also carries a pulley 52 on which a belt 53 runs. The belt 53 also runs on a pulley 54 carried by a shaft 56 of a motor 57. The motor 57 turns the shaft 30 to cause the mixing vanes 47 to swing inside the mixing hopper 31.

Figure 3:
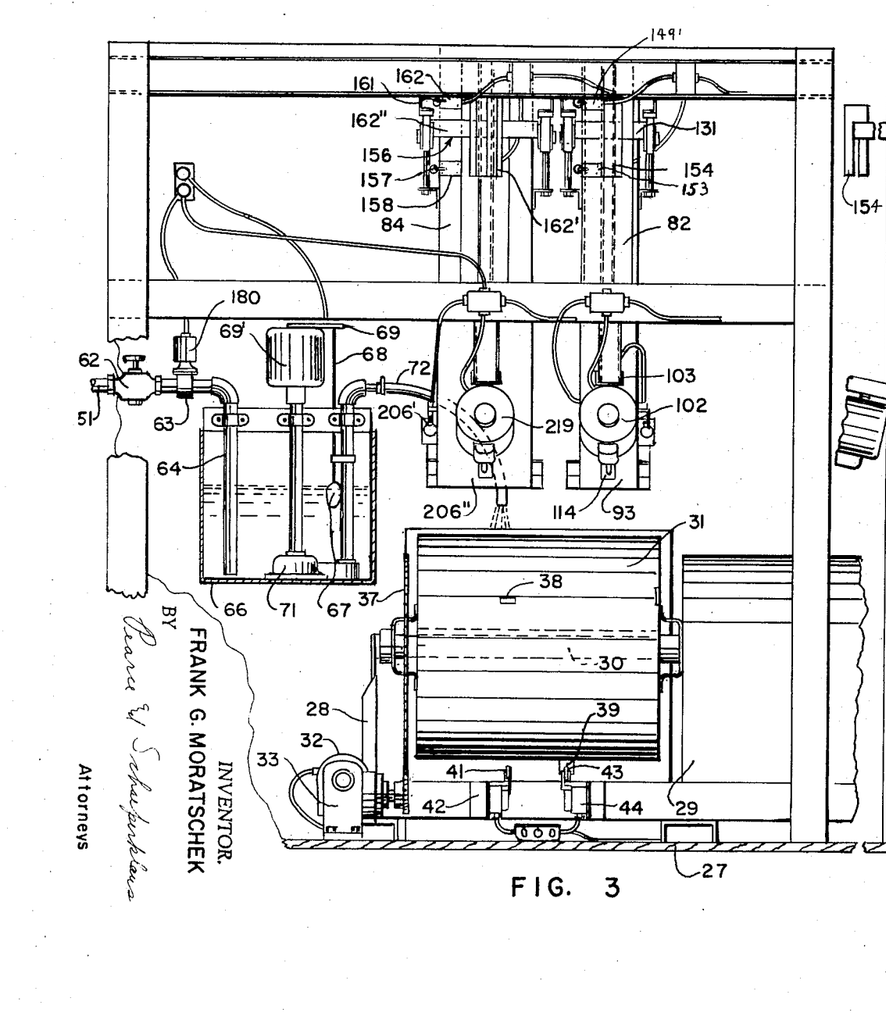
FIG. 3 is a view in rear elevation of a portion of the machine shown in FIG. 1, a mixing hopper thereof being shown in dumping position.
Figure 4:
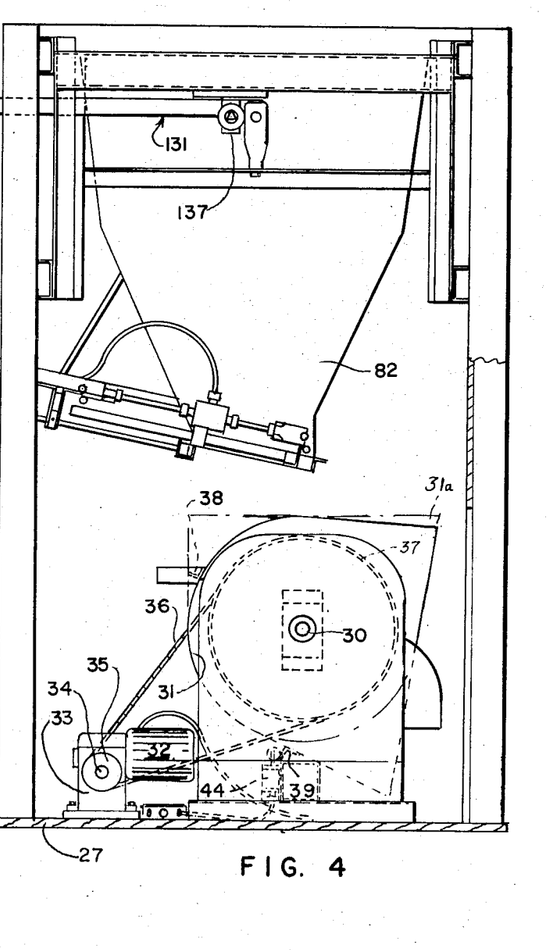
FIG. 4 is a view in side elevation of the portion of the machine shown in FIG. 3, drive mechanism being omitted for clarity, the mixing hopper being shown in upright position in dot-dash lines.
Figure 5:
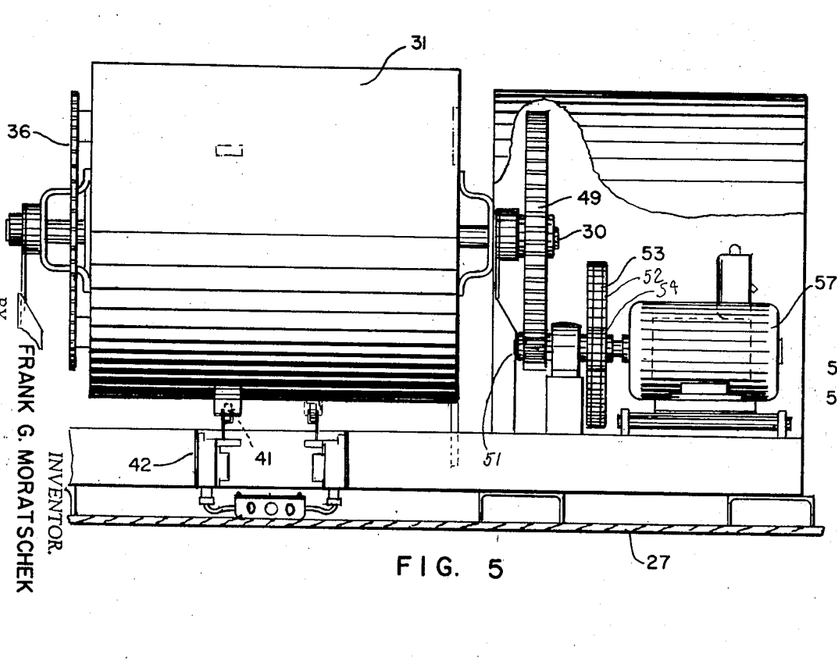
FIG. 5 is a view in rear elevation on an enlarged scale of a mixer portion of the machine with the mixing hopper in upright position, the mixing hopper in dumping position being shown in dot-dash lines.
Figure 16:
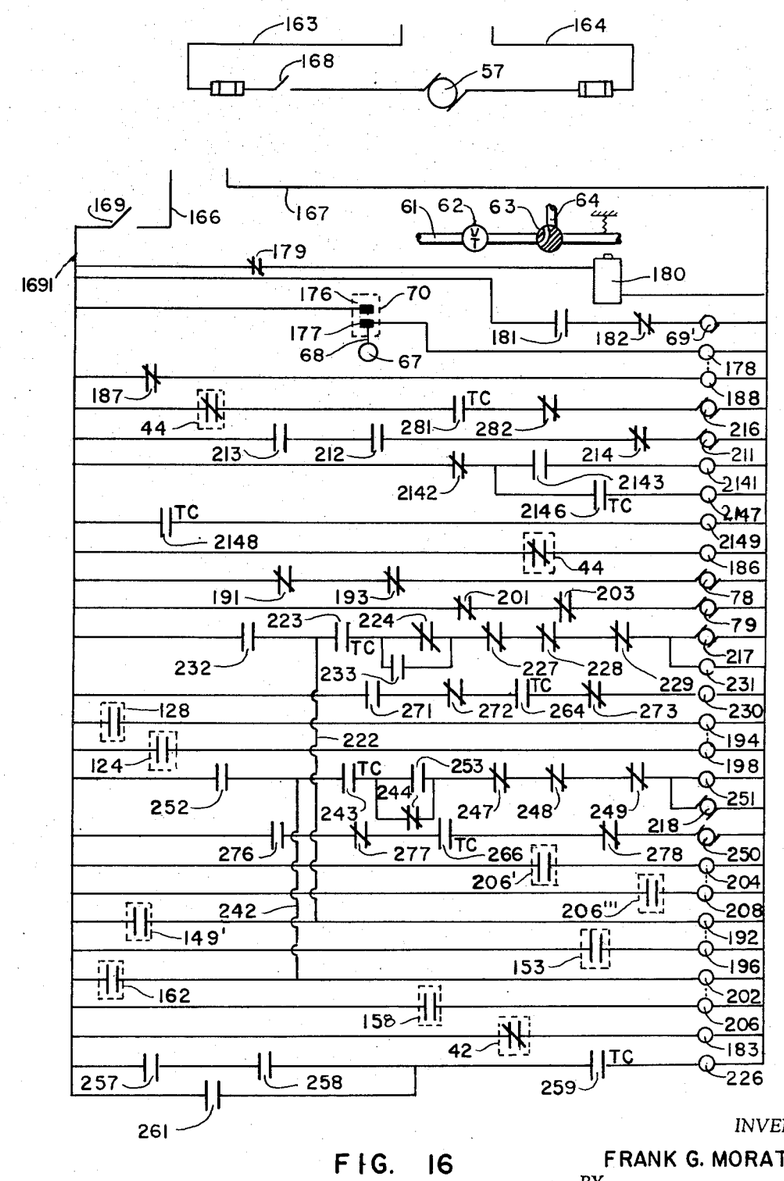
FIG. 16 is a schematic circuit diagram for the machine.

Water is supplied to the mixing hopper 31 from a main 61 (FIG. 3). Water from the main 61 passes through an adjustable control valve 62 and a solenoid operated valve 63 to a line 64 which empties into a measuring vessel 66. A float 67 in the measuring vessel 66 operates an upright rod 68 which raises a control arm 69 when a predetermined level of water is reached in the vessel 66 to operate a switch 70 (FIG. 16). When water is to be delivered to the mixing hopper 31 (FIG. 3), a motor 69' is energized to operate a sump pump 71 which pumps the water from the vessel 66 to be discharged through a hose 72 into the mixing hopper 31.

Cement and sand are supplied by conveyors 73 and 74 (FIG. 1) respectively. The conveyor 73 (FIG. 2) includes an outer cylindrical housing 76 inside which an appropriate helical conveyor screw 77 (FIG. 2) operates. A motor 78 drives the conveyor screw 77. A motor 79 (FIG. 1) drives a similar conveyor screw (not shown) of the conveyor 74. Cement from the conveyor 73 is discharged along a chute 81 (FIG. 2) into a weigh hopper 82. Sand from the conveyor 74 is discharged into a weigh hopper 84 (FIG. 3). The weigh hoppers are similar in construction, and only the weigh hopper 82 will be described in detail.

Figure 7:
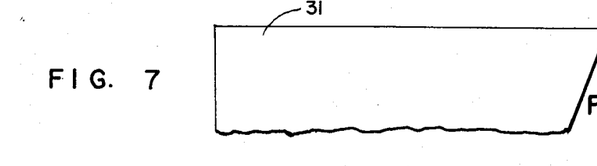
FIG. 7 is a view in side elevation on an enlarged scale of a weigh hopper which forms a portion of the machine with a gate thereof in closed position, a fragmentary portion of the mixing hopper being shown in association therewith in loading position.
Figures 9, 13:
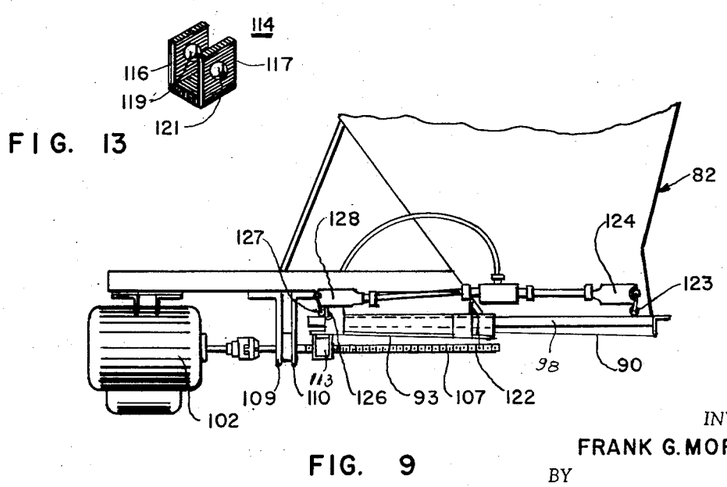
FIG. 9 is a fragmentary view in side elevation of the weight hopper shown in FIG. 7 with the gate thereof in open position.
FIG. 13 is an enlarged perspective view of a bracket which forms a part of a gate operating structure of the weigh hopper.

The weigh hopper 82 has a hollow body including front and rear walls 87 and 88 (FIG. 7) and side walls 89 and 91. The weigh hopper 82 is open at the top as indicated at 92 to permit cement to be received thereinside and the weigh hopper 82 is also open at the bottom, as indicated at 90 in FIG. 9. A gate plate 93 (FIG. 10) can close the open bottom. The gate plate 93 is provided with angle shaped upwardly extending hanger flanges 94 and 96 which overlie angle shaped rails 97 and 98, respectively. The rails 97 and 98 are attached to the side walls 91 and 89, respectively, of the weigh hopper 82. Filler blocks 99 and 101 are mounted inside the rails to bridge the space between outer flanges of the rails and the side walls of the weigh hopper 82. A motor 102 (FIG. 7) opens and closes the gate plate 93. The motor 102 is supported on frame elements 103 mounted on the rear wall 88 of the weigh hopper 82. The motor 102 drives a shaft 104 which drives a universal joint 106. The universal joint 106 drives a screw 107 which carries a thrust collar 108. The thrust collar 108 is mounted between flanges 109 and 110 of angle members 111 and 112 supported from the frame elements 103. Adjacent faces 109' and 110' of the flanges 109 and 110, respectively (FIG. 14) bear on opposite faces of the thrust collar 108. An unthreaded head portion 112' of the screw 107, on which the thrust collar 108 is mounted, extends through bores 109'' and 110'' in the flanges 109 and 110. The screw 107 drives a nut 113 (FIG. 7) which is housed in a channel shaped housing 114. Upper ends of flanges 116 and 117 of the housing 114 are attached to the underside of the gate plate 93 (FIG. 7). The screw 107 extends through bores 119 and 121 (FIG. 13) in the flanges 116 and 117, respectively, of the housing 114. When the gate plate is in closed position, a lug 122 (FIGS. 7 and 9) carried by the gate plate 93 engages a switch operator 123 of a limit switch 124. When the gate plate 93 is in the open position, as shown in FIG. 9, a lug 126 on the gate plate 93 engages a switch operator 127 of a limit switch 128. As shown most clearly in FIG. 9, the planes of the open lower end face 90 of the weigh hopper 82 and of the gate plate 93 intersect the horizontal at a slightly greater angle than does the plane of the rails 97–98 so that, as the gate plate 93 is moved to closed position, the gate plate 93 moves toward the plane of the open lower end of the weigh hopper 82.

Figure 10:
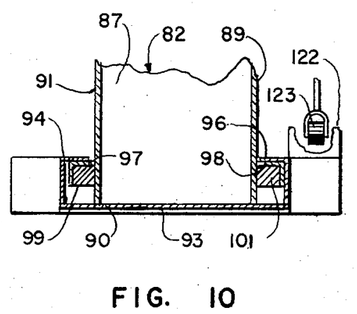
FIG. 10 is a view in section taken on an enlarged scale on the line 10—10 in FIG. 7.
Figure 11:
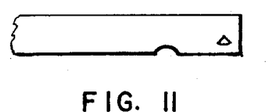
FIG. 11 is a fragmentary view of a weigh frame which forms a portion of the machine.
Figure 14:
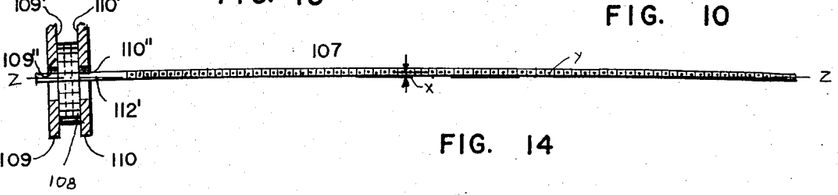
FIG. 14 is a somewhat schematic view showing a screw which is a part of the gate operating structure, curvature thereof being exaggerated for clarity.

As shown in FIG. 10, the gate plate 93 can move sidewise with respect to the open lower end of the weigh hopper 82 a limited amount. The screw 107 can be slightly bent so that, as the gate opens, the gate is caused to move back and forth to agitate the contents of the weigh hopper 82. In FIG. 14, the screw is shown with the bending thereof exaggerated for clarity. In a threaded portion $y$ which is 14 inches long, the deviation $x$ from a straight axis $z-z$ can be one-sixteenth inch.

Figure 8:
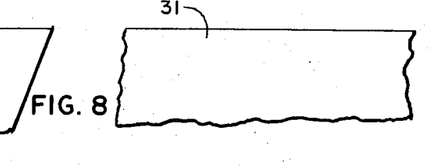
FIG. 8 is a view in front elevation of the weigh hopper and the fragmentary portion of the mixing hopper shown in FIG. 7.
Figure 12:
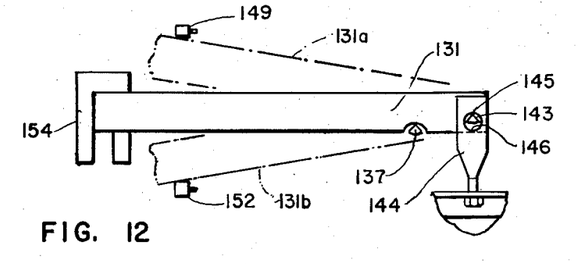
FIG. 12 is a somewhat schematic view of the weigh frame shown in FIG. 11 with associated switch operators and other associated parts.
Figure 15:
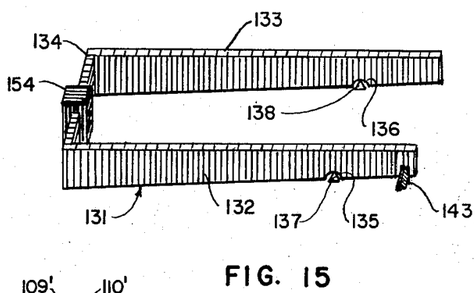
FIG. 15 is a fragmentary perspective view showing the weigh frame illustrated in FIG. 12 and associated elements.

The weigh hopper 82 is supported on a balance framework which includes a generally U-shaped main weigh frame 131 (FIGS. 7 and 15) including arms 132 and 133 are provided with half-round slots 135 and 136, respectively. The main weigh frame 131 is supported by knife-edge supports 137 and 138 which engage underfaces of the slots 135 and 136, respectively. Each of the knife edge supports is carried by a bracket 139, one of which is shown in FIG. 7. The bracket 139 is attached to a plate 141 attached to the underside of a horizontal frame element 142. Outwardly extending support pins 143 are mounted on the arms 132 and 133, one of the pins 143 being shown in FIG. 15. Brackets 144 and 144' (FIG. 8) are supported on the pins 143 in the manner that the bracket 144 is shown in FIG. 7. The upper edge of each of the pins 143 is provided with a knife edge 145 as shown in FIG. 12. The bracket 144 is provided with a transverse bore 146 in which the pin 143 is received. The bracket 144 can swing about and is supported by the pin 143. Similarly, the bracket 144 (FIG. 8) is supported by a pin (not shown in detail). The brackets 144 and 144' are attached to frames 147 and 147' mounted on the side walls 91 and 89, respectively, of the weigh hopper 82, as shown in FIG. 8. Ends of the frames 147 and 147' extend outwardly from the weigh hopper 82, as shown in FIG. 7, and terminate adjacent upright guide frames 148 and 148', being engageable with the guide frames for steadying the weigh hopper 82 as it moves up and down. As shown in FIG. 12, the main weigh frame 131 can swing between a hopper loaded position shown in dot-dash lines at 131a at which the weigh frame engages a switch operator 149 of a limit switch 149' (FIG. 7) and a loading position shown in double dot-dash lines at 131b (FIG. 12) at which the weigh frame engages a switch operator 152 of a limit switch 153 (FIG. 7). An appropriate counterweight 154 can be hung on the cross bar 134 of the weigh frame 131 as shown in FIG. 15 to determine the cement hopper load at which the weigh frame 131 changes position. A weigh frame 156 (FIG. 3) and associated supports and brackets are provided for the weigh hopper 84. When the weigh hopper 84 is in a loading position, the weigh frame 156 thereof engages a switch operator 157 of a limit switch 158. When the weigh hopper 84 is in a loaded position, the weigh frame 156 engages a switch operator 161 of a limit switch 162. An appropriate counterweight 162' hangs on a cross bar 162'' of the weigh frame 156 and determines the sand hopper load at which the weigh frame 156 changes position.

The operation of the machine will now be described with particular reference to FIG. 16. In FIG. 16 electric power leads are indicated at 163–164 and 166–167. During operation of the machine, on-off switches 168 and 169 are closed. Closing of the switch 168 energizes the mixing motor 57 which turns the mixing vanes 47. Closing of the switch 169 energizes the main circuits of the device. Operation of the machine is started by opening of the adjustable control valve 62. Water flows into the measuring vessel 66 (FIG. 3) until the float 67 rises to the predetermined level at which a sufficient volume of water is in the measuring vessel 66 for one batch of mortar. When that level is reached, switch contacts 176–177 (FIG. 16) close to energize a float latch relay 178. Energizing of the float latch relay 178 opens normally closed switch contacts 179 thereof to de-energize a solenoid 180 of the solenoid valve 63 permitting the solenoid valve 63 to close and stopping flow of water into the measuring vessel 66. Energizing of the float latch relay 178 also closes contacts 181 thereof which permit energizing of the sump pump motor 69' when contacts 182 of a load position relay 183 are closed. The load position relay 183 is energized except when the mixing hopper is in upright position. Contacts of the limit switch 42 energize the load position relay 183 except when the mixing hopper 31 is in upright or loading position.

The float latch relay 178 remains latched until the mixing hopper 31 moves to the dump position. When the mixing hopper 31 is in the dump position, normally closed contacts of the dump position limit switch 44 open to de-energize a dump position relay 186. Normally closed contacts 187 of the dump position relay 186 close when the dump position relay 186 is de-energized to operate a float latch release relay 188 which unlatches the float latch relay 178.

Cement is advanced along the cement conveyor 73 (FIG. 1) by operation of the motor 78 as long as normally closed contacts 191 (FIG. 16) of a cement weigh latching relay 192 are closed and normally closed contacts 193 of a cement gate latching relay 194 are also closed. The cement weigh latching relay 192 is energized and latched when the switch operator of the limit switch 149' (FIG. 7) is engaged by the cement weigh frame 131. When the weigh frame 131 engages the switch operator of the limit switch 153, a cement weigh unlatching relay 196 (FIG. 16) is energized to unlatch the cement weigh latching relay 192. The cement gate latching relay 194 is energized and latched when the switch operator of the limit switch 128 (FIG. 7) is actuated by the cement gate 93 in open position. When the gate 93 returns to closed position, the limit switch 124 is actuated to close the contacts thereof which energize a cement gate unlatching relay 198 (FIG. 16) to unlatch the cement gate latching relay 194. In a similar manner sand is advanced along the sand conveyor 74 (FIG. 1) by operation of the motor 79 as long as normally closed contacts 201 (FIG. 16) of a sand weigh latching relay 202 are closed and normally closed contacts 203 of a sand gate latching relay 204 are also closed. The sand weigh latching relay 202 is energized and latched when the switch operator of the limit switch 162 (FIG. 3) is engaged by the sand weigh frame 156. When the sand weigh frame 156 engages the switch operator of the limit switch 158, a sand weigh unlatching relay 206 (FIG. 16) is energized to unlatch the sand weigh latching relay 202. The sand gate latching relay 204 is energized and latched when the switch operator of a sand gate open limit switch 206' (FIG. 3) is actuated by a sand gate 206" in open position. When the gate 206" returns to closed position, a limit switch 206'" (FIG. 16) is actuated to close the contacts thereof to energize a sand gate unlatching relay 208 to unlatch the sand gate latching relay 204. Thus, each of the conveyors operates to supply material to the associated hopper only when the gate thereof is closed and operates until the associated hopper is sufficiently full that the weigh frame thereof swings to the hopper full position, the weight of material loaded in the associated hopper being determined by the size of the counterweight thereof.

The mixing hopper 31 (FIG. 4) is advanced to upright or loading position by a winding 211 (FIG. 16) of the motor 32 (FIG. 4), which drives the mixing hopper toward loading position. When the float latch relay 178 is energized, contacts 212 thereof close to energize the winding 211. The winding 211 is de-energized when the mixing hopper 31 reaches loading position by normally open contacts 213 of the load position relay 183, which are held closed by the load position relay 183 except when the mixing hopper is in loading position. Normally closed contacts 214 in series with the winding 211 are opened concurrently with operation of a second winding 216 of the motor 32 to prevent energizing of the winding 211 when the winding 214 is energized.

When the mixing hopper is in loading position and the contacts 181 of the float latch relay 178 are closed, action of the sump pump motor 69' is initiated by closing of the contacts 182 of the load position relay 183. In addition, a water time delay relay 2141 is energized through contacts 2142 of the load position relay 183 and normally open contacts 2143 of the float latch relay 178. When there has been a sufficient time for discharge of substantially all of the volume of water in the measuring vessel 66 through action of the sump pump 71, the water time delay relay 2141 operates to close contacts 2146 thereof to start operation of a solid material time delay relay 2147. When a sufficient time has passed for release of all of the solid material from the weigh hoppers, contacts 2148 of the solid material time delay relay 2147 close to start operation of a mixing time delay relay 2149.

When the sand weigh hopper 84 (FIG. 3) and the cement weigh hopper 82 have both been filled sufficiently that the weigh frames thereof have both shifted to hopper full position, the mixing hopper 31 is in loading position, and the volume of water from the measuring vessel 66 has been discharged into the mixing hopper 31 by action of the sump pump 71, the gates 93 and 206" are opened by operation of a cement gate opening winding 217 (FIG. 16) of the cement gate motor 102 (FIG. 7) and by a sand gate opening winding 218 (FIG. 16) of a sand gate motor 219 (FIG. 3), respectively.

Initial energizing of the cement gate opening winding 217 of the cement gate motor 102 is through a circuit through normally open contacts of the limit switch 149', which closes when the cement weigh hopper is full, a lead 222, contacts 223 of the water time delay relay 2141, normally closed contacts 224 of a control relay 226, normally closed contacts 227 of the load position relay 183, normally closed contacts 228 of the cement gate latching relay 194 and normally closed contacts 229 associated with a cement gate closing winding 230 of the cement gate motor 102. The contacts 229 prevent energizing of the cement gate opening winding 217 when the gate closing winding 230 is energized. When the gate opening winding 217 is energized, a relay 231 is also energized, and contacts 232 and 233 of the relay 231 close. The contacts 232 act to form a hold in circuit which continues energizing the winding 217 after the limit switch 149' opens. The contacts 233 bypass the contacts 224 of the control relay 226. The cement gate opening winding 217 remains energized until the contacts 228 are opened by the cement gate latching relay 194. In a similar manner, initial energizing of the sand gate opening winding 218 is by a circuit through normally open contacts of the limit switch 162, which closes when the sand weigh hopper is full, a lead 242, contacts 243 of the water time delay relay 2141, normally closed contacts 244 of the control relay 226, normally closed contacts 247 of the load position relay 183, normally closed contacts 248 of the sand gate latching relay 204 and normally closed contacts 249 associated with a sand gate closing winding 250 of the sand gate motor 219. The contacts 249 prevent energizing of the sand gate opening winding 218 when the sand gate closing winding 250 is energized. When the sand gate opening winding 218 is energized, a relay 251 is also energized, and contacts 252 and 253 of the relay 251 close. The contacts 252 act to form a hold-in circuit; the contacts 253 bypass the contacts 244 of the control relay 226. The sand gate opening winding 218 remains energized until the contacts 248 are opened by the sand gate latching relay 204.

Energizing of the relay 231 as the cement gate starts to open closes contacts 257 thereof. Similarly, energizing of the relay 251 as the sand gate starts to open closes contacts 258 thereof. The contacts 257 and 258 are in series with the control relay 226 and with normally open contacts 259 of the water time delay relay 2141. The control relay thus is energized when the cement and sand gates start to open. When the control relay 226 is energized, the contacts 224 and 244 thereof are open so that, once one of the gates has fully opened, that gate cannot start to open again until the control relay 226 has been de-energized. Normally open hold-in contacts 261 of the control relay 226 keep the control relay energized until the contacts 259 of the water time delay relay 2141 open as the mixing hopper is dumped, as will be explained more fully hereinafter.

When the cement gate 93 reaches fully open position, the contacts 228 of the cement gate latching relay 194 open to de-energize the cement gate opening winding 217 and the relay 231. Similarly, when the sand gate 206'' reaches fully open position, the contacts 248 of the sand gate latching relay 204 open to de-energize the sand gate opening winding 218 and the relay 251. The gates remain open for a sufficient time to permit contents of the weigh hoppers to be discharged into the mixing hopper. This time is determined by the solid material time delay relay 2147. When this time has passed, contacts 264 and 266 of the solid material time delay relay 2147 close. Closing of the contacts 264 energizes the cement gate closing winding 230. Closing of the contacts 266 energizes the sand gate closing winding 250. The cement gate closing winding 230 is in series with normally open contacts 271 of the cement gate latching relay 194, which close when the cement gate reaches open position, normally closed contacts 272 of the cement weigh relay 192, and normally closed contacts 273 of the relay 231, which prevent energizing of the cement gate closing 230 winding when the cement gate opening winding 217 is energized. Similarly, the sand gate closing winding 250 is in series with normally open contacts 276 of the sand gate latching relay 204, which close when the sand gate reaches open position, normally closed contacts 277 of the sand weigh relay 202, and normally closed contacts 278 of the relay 251, which prevent energizing of the sand gate closing winding 250, when the sand gate opening winding 218 is energized. When the cement gate is fully closed, the contacts 271 open to de-energize the cement gate closing winding 230. When the sand gate is fully closed, the contacts 276 open to de-energize the sand gate closing winding 250.

The mixing hopper 31 remains in upright position while the contents thereof are mixed by the mixing vanes 47 for a sufficient time to cause thorough mixing of the water, cement and sand to form mortar. This time is determined by the mixing time delay relay 2149. After a sufficient mixing time, contacts 281 of the relay 2149 close to energize the second winding 216 of the motor 32 (FIG. 4) which swings the mixing hopper 31 to dump position. Normally closed contacts 282 associated with the first winding 211 of the motor 32 and in series with the second winding 216 (FIG. 16) prevent energizing of the second winding 216 when the first winding 211 is energized. The second winding 216 is de-energized when the mixing hopper 31 is in dump position by the limit switch 44 which is in series therewith and is open when the mixing hopper is in dump position. The mortar is discharged from the mixing hopper 31 through an opening 311 (FIG. 2) in the floor of the enclosure 21 into an appropriate receptacle 312.

When the mixing hopper 31 swings away from the loading position, the contacts 2142 (FIG. 16) of the load position relay 183 open to de-energize the water time delay relay 2141 and the solid material time delay relay 2147. De-energizing of the water time delay relay 2141 opens the contacts 259 thereof to de-energize the control relay 226. De-energizing of the solid material time delay relay 2147 opens contacts 2148 thereof to de-energize the mixing time delay relay 2149 to reset the time delay relays for the next cycle of the machine. The time between cycles can be determined by the rate at which water is admitted through the adjustable water valve 62 (FIG. 3).

The mortar batch making machine described above and illustrated in the drawings is subject to structural modification without departing from the spirit and scope of the appended claims.

Having described my invention, what I claim as new and desire to secure by letters patent is:

1. A mortar mixing machine which comprises a mixing hopper, means for delivering a predetermined amount of water into the mixing hopper, a weigh frame pivotally mounted above the mixing hopper, a weigh hopper mounted on the weigh frame, conveyor means for advancing granular solid material to the weigh hopper, switch means actuated by the weigh frame and associated with the conveyor means for arresting the conveyor means when there is a predetermined weight of the solid material in the weigh hopper, means for dumping the contents of the weigh hopper into the mixing hopper to be mixed with the water in the mixing hopper to form a batch of mortar, means for swinging the mixing hopper between an upright loading position and a dumping position, means for disabling the water delivery means and the weigh hopper dumping means when the mixing hopper is away from loading position, the means for dumping the contents of the weigh hopper including a gate for closing an opening in a lower portion of the weigh hopper, means for opening the gate and means for disabling the gate opening means until a predetermined time following initiation of the water delivery means, means for disabling the mixing hopper swinging means until a predetermined time following operation of the gate opening means, the water delivery means including a measuring vessel, means for introducing water into the measuring vessel, means for disabling the means for introducing water into the measuring vessel until the mixing hopper is at dumping position, means for disabling the water delivery means until the predetermined amount of water has been introduced into the measuring vessel and an adjustable throttle valve in the means for introducing water into the measuring vessel for controlling the rate of delivery of water to the measuring vessel and the time interval between delivery of batches of mortar.

2. A mortar mixing machine which comprises a mixing hopper, a weigh hopper mounted above the mixing hopper, means for advancing granular solid material to the weigh hopper, and means for dumping the contents of the weigh hopper into the mixing hopper, the means for dumping the contents of the weigh hopper including a reciprocating gate for closing an opening in a lower portion of the weigh hopper, the gate being mounted for limited sidewise movement in the plane thereof, a bowed drive shaft rotatably mounted on the weigh hopper, means for turning the shaft, a nut mounted on the shaft, means for interconnecting the nut and the gate to prevent relative movement of the nut and the gate lengthwise of the shaft, the gate being vibrated by the shaft as the shaft opens the gate to agitate contents of the weigh hopper as the gate is opened.

* * * * *